US009452587B2

(12) United States Patent
Kisailus et al.

(10) Patent No.: US 9,452,587 B2
(45) Date of Patent: Sep. 27, 2016

(54) SHOCK AND IMPACT RESISTANT MATERIALS

(71) Applicant: The Regents of the University of California, Oakland, CA (US)

(72) Inventors: David Kisailus, Riverside, CA (US); Garrett Milliron, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 484 days.

(21) Appl. No.: 13/957,708

(22) Filed: Aug. 2, 2013

(65) Prior Publication Data

US 2014/0033411 A1    Feb. 6, 2014

Related U.S. Application Data

(60) Provisional application No. 61/680,207, filed on Aug. 6, 2012, provisional application No. 61/680,210, filed on Aug. 6, 2012.

(51) Int. Cl.
*B32B 5/12*  (2006.01)
*B32B 5/26*  (2006.01)

(52) U.S. Cl.
CPC . *B32B 5/12* (2013.01); *B32B 5/26* (2013.01); *B32B 2250/20* (2013.01); *B32B 2260/023* (2013.01); *B32B 2260/046* (2013.01); *B32B 2262/02* (2013.01); *B32B 2262/067* (2013.01); *B32B 2262/10* (2013.01); *B32B 2262/101* (2013.01); *B32B 2262/106* (2013.01); *B32B 2307/302* (2013.01); *B32B 2307/306* (2013.01); *B32B 2307/3065* (2013.01); *B32B 2307/554* (2013.01); *B32B 2307/558* (2013.01); *B32B 2307/714* (2013.01); *B32B 2571/00* (2013.01); *B32B 2571/02* (2013.01); *B32B 2605/00* (2013.01); *Y10T 428/24124* (2015.01)

(58) Field of Classification Search
CPC ............ F41H 5/0485; A41D 13/0015; A41D 13/0568
USPC ........................................ 428/113; 2/69, 455
See application file for complete search history.

(56) References Cited

U.S. PATENT DOCUMENTS

2013/0280516 A1*  10/2013  Kozar ................... B29C 70/083
                                                            428/293.4

* cited by examiner

*Primary Examiner* — Brent O'Hern
(74) *Attorney, Agent, or Firm* — Joseph R. Baker, Jr.; Gavrilovich, Dodd & Lindsey LLP (57) ABSTRACT

Material composites are provided that have improved shock and impact resistance.

19 Claims, 3 Drawing Sheets

SHOCK AND IMPACT RESISTANT MATERIALS

CROSS REFERENCE TO RELATED APPLICATIONS

This application claims priority under 35 U.S.C. §119 to Provisional Application Ser. No. 61/680,207, filed Aug. 6, 2012 and Provisional Application Ser. No. 61/680,210, filed Aug. 6, 2012, the disclosures of which are incorporated herein by reference.

STATEMENT AS TO FEDERALLY SPONSORED RESEARCH

The U.S. Government has certain rights in this invention pursuant to Grant No. A010082216944 awarded by the National Science Foundation.

TECHNICAL FIELD

The disclosure provides for shock and impact resistant materials.

BACKGROUND

Shock and impact resistance materials are useful for body armor, work safety equipment and automotive paneling.

SUMMARY

The disclosure provides for fiber reinforced elastic composite materials that exhibit shock and impact resistance. In a particular embodiment, the disclosure provides for a fiber reinforced elastic composite material comprising a series of stacked fiber ply layers within a matrix which comprises a lower elastic modulus material. In a further embodiment, the disclosure provides that the fibers of each fiber ply layer are rotated along the longitudinal axis at a predefined angle relative to the next adjacent layer. In a preferred embodiment, the fibers of each fiber ply layer are rotated along the longitudinal axis so as to be substantially helicoidal. In a further embodiment, the helicoidal fibers are designed to have a specific pitch tuned to the wavelength of a propagating shock wave. In yet a further embodiment, the interstitial spaces between the fibers is filled with a matrix that comprises microspheres. In an additional embodiment, the microspheres can introduce micropores throughout the matrix.

The properties of the fiber reinforced elastic composite materials disclosed herein is tunable by (1) modifying pitch of the fibers, (2) exploiting the difference in elastic moduli between fibers and matrix, and (3) providing micropores in the matrix to prevent or arrest propagation of catastrophic fractures, such as fractures generated from blunt or sharp impacts. Further, the chirality of the spiral formed from the assembly of these pitched fibers can affect the specific circular polarization (i.e., left-handed or right-handed rotation). The composite materials disclosed herein provide an additional benefit of added toughness (absorption of energy) by controlling propagation of fractures, such as those generated by blunt or sharp impacts. Moreover, the composite materials disclosed herein can reflect or deflect shock waves, such as those created by explosions.

In a particular embodiment, the disclosure provides for a fiber reinforced elastic composite material comprising: a multiplicity of fiber ply layers, each fiber of each layer being rotated along the longitudinal axis at a desired angle relative to the next adjacent layer, each extending longitudinally over the composite; and a matrix comprising an elastic material having a modulus of elasticity that is lower than that of the fiber that substantially fills the interstitial spaces between the fibers. In a further embodiment, fibers comprise 20 to 80 percent by weight of the composite material. In another embodiment, the composite material comprises 2,000 to 70,000,000 fibers. In yet another embodiment, the fiber ply layers of the composite material are arranged so that the fibers are substantially helicoidal. In a further embodiment, the fiber ply layers of the composite material comprise carbon fibers, nylon fibers, acrylic fibers, wood fibers, basalt fibers, glass fibers, aramid fibers, polyethylene fibers, polyparaphenylene fibers, benzobisoxazole fibers, polybenzamidazole fibers, or any combination thereof. In yet a further embodiment, the fiber ply layers of the composite material comprises fibers having a length between 0.1 mm to 33 mm. In another embodiment, the fibers of the fiber ply layers are treated by sizing, additives, and/or curing.

In a particular embodiment, the disclosure also provides for a fiber reinforced elastic composite material comprising: a multiplicity of fiber ply layers, each fiber of each layer being rotated along the longitudinal axis at a desired angle relative to the next adjacent layer, each extending longitudinally over the composite; and a matrix comprising an elastic material having a modulus of elasticity that is lower than that of the fiber that substantially fills the interstitial spaces between the fibers. In a further embodiment, the elastic material can form crosslinks. In yet another embodiment, the elastic material is ceramic, thermoset resin, or thermoplastic resin. In an additional embodiment, the thermoset resin or the thermoplastic resin further comprises one or more fillers so as to reduce cost, control shrinkage, improve mechanical and physical properties, provide ultra violet (UV) protection, weathering protection, surface smoothness, temperature resistance, impact strength, and/or provide fire resistance. In a particular embodiment the thermoset resin is an epoxy, such as Spurrs™ epoxy. In an additional embodiment, the matrix further comprises one or more additives including, but not limited to, accelerators, flexibilizers, release agents, plasticizers, viscosity control agents, hardeners, air release agents, toughness agents, electrical conductivity agents, antistatic agents, and antioxidants. In a further embodiment, the matrix or the elastic material further comprises microspheres. In yet a further embodiment, the microspheres introduce micropores throughout the matrix. In another embodiment, the microspheres are expandable polymeric microspheres. In yet another embodiment, the microspheres are from about 1 µm to about 100 µm in diameter.

In a particular embodiment, the disclosure provides for a fiber reinforced elastic composite material comprising: 2 to 100 independently orientated fiber ply layers, each fiber of each layer being rotated along the longitudinal axis at a desired angle relative to the next adjacent layer, each extending longitudinally over the composite; and a matrix comprising an elastic material having a modulus of elasticity that is lower than that of the fiber that substantially fills the interstitial spaces between the fibers. In a further embodiment, the fiber ply layers are substantially helicoidal. In additional embodiment, the fiber ply layers are substantially left-handed helicoidal, substantially right-handed helicoidal, or comprise a portion that are substantially left-handed helicoidal while another portion are substantially right-handed helicoidal.

In a certain embodiment, the disclosure provides for a fiber reinforced elastic composite material that further comprises a thermal barrier coating, wear resistant coating, corrosion resistant coating, or electrically conductive coating. In a further embodiment, the composite material further comprises an aluminum oxide wear resistant coating.

The disclosure also provides for a garment comprising a fiber reinforced elastic composite material disclosed herein.

The disclosure further provides for sporting or work safety equipment comprising a fiber reinforced elastic composite material disclosed herein.

The details of one or more embodiments of the disclosure are set forth in the accompanying drawings and the description below. Other features, objects, and advantages of the disclosure will be apparent from the description and drawings, and from the claims.

DETAILED DESCRIPTION

As used herein and in the appended claims, the singular forms "a," "and," and "the" include plural referents unless the context clearly dictates otherwise. Thus, for example, reference to "a material" includes a plurality of such materials and reference to "the composite" includes reference to one or more composites, and so forth.

Unless defined otherwise, all technical and scientific terms used herein have the same meaning as commonly understood to one of ordinary skill in the art to which this disclosure belongs. Although many methods and reagents similar or equivalent to those described herein can be used in the practice of the disclosed methods and compositions, the exemplary methods and materials are described herein.

Also, the use of "or" means "and/or" unless indicated otherwise, such as by the use of the term "either." Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated by reference in full for the purpose of describing and disclosing methodologies that might be used in connection with the description herein. Moreover, with respect to any term that is presented in the publications that is similar to, or identical with, a term that has been expressly defined in this disclosure, the definition of the term as expressly provided in this disclosure will control in all respects.

The disclosure provides for fiber reinforced elastic composite materials comprising fibers impregnated within a matrix that comprises an elastic material, where each fiber is rotated along the longitudinal axis at a predefined angle. In a particular embodiment, the composite material of the disclosure is comprised of a single layer of helicoidal orientated fibers within a matrix comprising a lower elastic modulus material. In an alternate embodiment, the disclosure provides for a composite material comprising a multiplicity of orientated fiber ply layers stacked on top of each other within a matrix comprising a lower elastic modulus material. In a further embodiment, the fiber ply layers are stacked so that the fibers from a ply layer have a different angle of rotation, pitch and/or direction along the longitudinal axis relative to fibers from an adjacent ply layer(s). In an alternate embodiment, the fiber ply layers are stacked so that the fibers from a ply layer have a similar angle of rotation, pitch and/or direction along the longitudinal axis relative to fibers from an adjacent ply layer(s). In yet another embodiment, the stacked fiber ply layers comprise a portion of stacked fiber plies that comprise fibers from a ply layer that have a different angle of rotation, pitch and/or direction along the longitudinal axis relative to fibers from an adjacent ply layer(s), and a portion of stacked fiber play layers that comprise fibers from a ply layer that have a similar angle of rotation, pitch and/or direction along the longitudinal axis relative to fibers from an adjacent ply layer(s). In a certain embodiment, the disclosure provides for a composite material comprising a multiplicity of helicoidal orientated fiber ply layers stacked on top of each other within a matrix comprising a lower elastic modulus material.

The disclosure further provides for a fiber reinforced elastic composite material comprising between 2 to 100 layers of independently orientated fiber plies, between 2 to 80 layers of independently orientated fiber plies, between 5 to 70 layers of independently orientated fiber plies, between 10 to 60 layers of independently orientated fiber plies, between 15 to 50 layers of independently orientated fiber plies, or between 20 to 40 layers of independently orientated fiber plies, within a matrix comprising a lower elastic modulus material. In another embodiment, the disclosure provides for a fiber reinforced elastic composite material comprising at least 5 layers of independently orientated fiber plies, at least 10 layers of independently orientated fiber plies, at least 15 layers of independently orientated fiber plies, at least 20 layers of independently orientated fiber plies, or at least 30 layers of independently orientated fiber plies, within a matrix comprising a lower elastic modulus material.

The disclosure further provides that the fiber reinforced elastic composite materials disclosed herein are comprised of layer(s) of fibers wherein the fibers have an angle of rotation, pitch and/or direction along the longitudinal axis. Examples of angles of rotation for the fibers disclosed include, between 0° to 90°, between 5° to 85°, between 10° to 80°, between 15° to 75°, between 20° to 70°, or between 25° to 65°.

A number of fiber-types can be used with the composite materials of the disclosure. Such fiber-types include, but are not limited to, carbon, nylon, acrylic, wood, basalt, glass (e.g., fiberglass), aramid (e.g., Kevlar®, Twaron®, Tehnora®, Artec®, Thor®, Parax®, and TPR®), polyethylene (e.g., Spectra® and Dyneema®), polyparaphenylene benzobisoxazole (e.g., Zylon®), polybenzamidazole (PBI), and combinations thereof as well as other polymer fibers known in the art.

The disclosure also provides that the fiber reinforced elastic composite materials disclosed herein can be comprised of fibers of varying lengths. Moreover, discrete filaments of one specific fiber-type or mixtures of different fibers can also be used. The fibers can be chopped to any desired length with cutting methods typically used in the art, including, but not limited to, cutting methods that use knives and a bedplate, squeeze reels with knife slash through, rubber covered squeeze rolls with protruding knives, reel and roller, and reel and cam. For example, fibers having lengths from 0.1 mm to 30 mm, 1.0 mm to 25 mm, 1.5 mm to 20 mm, 2.0 mm to 15 mm, 2.5 mm to 10 mm, or 3.0 mm to 8 mm can all be used with the reinforced elastic composite materials of disclosure. Typically, the composite materials disclosed herein comprise fibers from about 1.5 mm (0.0625 inch) to about 6.4 mm (0.25 inch)) in length.

The amount of fibers in the fiber reinforced elastic composite materials disclosed herein can vary. Consideration of factors, such as fiber length, composite properties, ease of processing, production costs, and the like, are generally taken into account in determining the amount of fibers to be used. The tensile and flexible strength of the composites typically increase with fiber loading up to a certain weight percent and then decreases beyond this value. As the disclosure provides for fiber reinforced elastic composite materials which may be comprised of different types of fibers, combinations of fibers, different types of elastic materials, etc. the ideal wt. % will be dependent upon the composition of the desired composite material. Typically, fiber loading is no less than 3 wt. %, and generally above 5 wt. %. In a certain embodiment, the fiber loading is between 3 wt. % to 80 wt. %, between 10 wt. % to 80 wt. %, between 20 wt. % to 80 wt. %, between 3 wt. % to 60 wt. %, between 10 wt. % to 60 wt. %, between 20 wt. % to 60 wt. %, between 3 wt. % to 50 wt. %, between 10 wt. % to 50 wt. %, or between 20 wt. % to 50 wt. %. In another embodiment, the fiber reinforced elastic composite materials disclosed herein comprise at least 500 fibers, at least, 1,000 fibers, at least 2,000 fibers, at least 5,000 fibers, at least 10,000 fibers, at least 50,000 fibers, at least 100,000 fibers, at least 500,000 fibers, at least 1,000,000 fibers, at least 5,000,000 fibers, at least 10,000,000 fibers, or at least 50,000,000 fibers. In a particular embodiment, a reinforced elastic composite material disclosed herein comprises 2,000 to 70,000,000 fibers, 5,000 to 50,000,000 fibers, 10,000 to 10,000,000 fibers, 20,000 to 1,000,000 fibers, 50,000 to 500,000 fibers, or 75,000 to 250,000 fibers.

In a particular embodiment, the fiber reinforced elastic composite materials comprise layers of fibers having a certain aspect ratio (i.e., the length:radial dimension) that typically is greater than 1. Each layer of fibers is pivoted at the longitudinal center relative to the immediate next fiber layer such that each adjacent layer is titled at a desired angle to the next layer. In this way a helicoidal layering of fibers is generated. Accordingly, a generalized helicoidal layering of fibers can be described by the following parametric equations in Cartesian coordinates:

$x = \rho \cos(\alpha\theta)$, $y = \rho \sin(\alpha\theta)$, $z = \theta$, (Eq. 1)

where $\rho$ and $\theta$ range from negative infinity to positive infinity, while $\alpha$ is constant. If $\alpha$ is positive, then the helicoid is right-handed. If $\alpha$ is negative, then the helicoid is left-handed. In a certain embodiment, a composite material of the disclosure comprises a left-handed helicoidal layering of fibers (i.e., $\alpha$ of Eq. 1 is negative). In an alternate embodiment, a composite material of the disclosure comprises a right-handed helicoidal layering of fibers (i.e., $\alpha$ of Eq. 1 is positive). In yet another embodiment, a composite material of the disclosure comprises a mixture of right-handed helicoidal layering of fibers and left-handed helicoidal layering of fibers. In a further embodiment, the mixture alternates from right-handed helicoidal layering of fibers to left-handed helicoidal layering of fibers, or vice versa.

The disclosure further provides that the fibers may be treated prior to being impregnated within a matrix. Examples of fiber treatments including sizing, additives and curing. Sizing is the treatment of fiber surface with coupling agents (that couple resin to fibers), to protect the fiber against moisture and reactive fluid attacks. Sizing improves wettability of the fiber surface for the elastic material, thereby facilitating stronger bonding between the fiber and the elastic material. Sizing for different fibers include: improving the interfacial bond between glass fibers and the matrix and to protect the glass fibers from environmental attacks; promoting chemical bonding between the matrix and carbon fiber surfaces by pitting carbon fibers so as to provide an increased number of fiber-matrix interfacial contact points; and enhancing surface adhesion of polymeric fibers (e.g., aramid fibers) to resins. In a particular embodiment, the reinforced elastic composite materials of disclosure comprise fibers which have been treated by sizing prior to being impregnated within a matrix comprising an elastic material.

In another embodiment, the disclosure provides that the fiber reinforced elastic composite materials may further comprise different kinds of additives and modifiers so as to modify the properties of the composites disclosed herein (e.g., fire proofing). For example, catalysts, accelerators (e.g., dimethylaminoethanol), promoters, and inhibitors can be used to accelerate or slow the rate of polymerization of the matrix; flexibilizers (e.g., diglycidyl ether of propylene glycol) to increase or decrease the hardness of the matrix; release agents may be used to facilitate the removal of the composites from molds and the like; other agents may be used to improve processability, such as plasticizers, or product durability; viscosity control agents may be added to the matrix in order to help control the flow; hardeners can be added to the matrix to provide a harder surface or finish (e.g., nonenyl succinic anhydride); air release agents may also be used to reduce air voids in the composites; toughness agents may be added so as increase the toughness of the fibers; electrical conductivity agents may be used to shield conductivity from certain fibers; antistatic agents may be used to reduce static or electrical charge of the composite material; and antioxidants (as additives) can be used to prevent oxidation of the composite material.

An elastic modulus, or modulus of elasticity, is the mathematical description of an object or substance's tendency to be deformed elastically (i.e., non-permanently) when a force is applied to it. The elastic modulus of an object is defined as the slope of its stress-strain curve in the elastic deformation region. As such, a stiffer material will have a higher elastic modulus. Accordingly, in the composites of the disclosure, the fibers are stiffer than the elastic material. The composite materials by having an elasticity modulus lower than the fiber-type, imparts the material with shock and impact resistant properties.

For example, the formula for deformation and thus elastic modulus can be expressed as:

$$\lambda = \frac{\text{stress}}{\text{strain}} \quad \text{(Eq. 2)}$$

where lambda ($\lambda$) is the elastic modulus; stress is the restoring force caused due to the deformation divided by the area to which the force is applied; and strain is the ratio of the change caused by the stress to the original state of the object. Strain is a dimensionless quantity. For example, if stress is measured in pascals (Pa) then of $\lambda$ will also be expressed in pascals.

Since the denominator becomes unity if length is doubled, the elastic modulus becomes the stress induced in the material, when the sample of the material turns double of its original length on applying external force. While this endpoint is not realistic because most materials will fail before reaching it, it is practical, in that small fractions of the defining load will operate in exactly the same ratio. Thus, for steel with a Young's modulus of 30 million psi, a 30 thousand psi load will elongate a 1 inch bar by one thousandth of an inch; similarly, for metric units, where a thousandth of the modulus in gigapascals will change a meter by a millimeter.

For the composite materials disclosed herein, interstitial spaces of the layered fiber plies are impregnated with a matrix comprising an elastic material having an elasticity that is lower than the elasticity of the fibers. Examples of elastic materials that can be used include ceramics, foams, thermoset resins (e.g., epoxies, poly urethanes, phenol formaldehyde resins, duroplast, urea-formaldehyde, melamine resin, polyimides, mold runners, and cyanate esters), and thermoplastic resins (e.g., polyethylene, polyamides, polypropylene, polystyrene, acrylic, polyvinyl chloride and Teflon). Typically the elastic material is a polymer that can form cross links, such as epoxy. In a particular embodiment, the interstitial spaces of the layered fiber plies are impregnated with matrix comprising a thermoset resin having an elasticity that is lower than the elasticity of the fibers. In alternate embodiment, the interstitial spaces of the layered fiber plies are impregnated with a matrix comprising a thermoplastic resin having an elasticity that is lower than the elasticity of the fibers. Thermoset resins in comparison to thermoplastic resins have better creep and chemical resistance, lower stress relaxation, and better thermal stabilities. By contrast, the primary advantage of thermoplastic resins over thermoset resins is the high impact strength and fracture resistance. Moreover, thermoplastic resins also provide higher strains-to-failure, which is manifested by better resistance to microcracking. For elastic materials comprising thermoplastic resins, heat stabilizers can be used to protect polymers from degradation due to heat, and UV stabilizers can be used to protect the materials from UV degradation. In addition, fillers can be added to elastic materials comprising either thermoset or thermoplastic resins in order to reduce cost, control shrinkage, improve mechanical and physical properties, provide ultra violet (UV) protection, weathering protection, surface smoothness, temperature resistance, impact strength, and fire resistance. In a particular embodiment, fillers may account from 5% to 70% by weight of the elastic material disclosed herein.

In a particular and preferred embodiment, the elastic material or matrix further comprises microspheres. The microspheres disclosed herein, may be used as matrix additive, elastic material filler, and/or impact resistant coating. Microspheres (e.g., hollow micro-balloons or micro-bubbles) find prevalent use in industry, most commonly as additives or fillers. A benefit of microspheres over other types of additives or fillers (e.g., silicates, aluminates, clays, talcs, and the like) is that the hollow feature of the microsphere results in weight reduction. Microspheres offer a means of introducing controlled, small voids in a closed-cell configuration. This can be difficult to obtain in both viscous and non-viscous fluids, resins, coatings, and cements using conventional foaming agents. Thus, microspheres provide a means for uniformly and homogeneously increasing product bulk while simultaneously decreasing the overall density, lowering product cost on a volumetric basis without sacrificing (or while enhancing) performance.

In addition to the benefits of weight reduction and cheaper product cost, microspheres offer many other advantages in a wide variety of products. For example, an overall increased volume load capacity leading to a higher loading capacities in turn lead to dimensional stability, improved applicability, and further overall weight reduction or density reduction.

The "microspheres" of the disclosure are micron-sized generally spheroid particles that can be comprised of various materials. In some aspect the microsphere may have incorporated therein a chemical or physical blowing agent, and which may be expanded upon heating. The microspheres of the disclosure can have any desired diameter. For example, the diameters of the microspheres disclosed herein may have an average diameter from about 5 to about 150 μm, from about 7 to about 125 μm, from about 10 to about 100 μm, from about 15 to about 90 μm, from about 20 to about 85 μm, from about 25 to about 80 μm, from about 30 to about 75 μm, from about 35 to about 70 μm, or from about 40 to about 60 μm. Typically, the average diameter for the microspheres is about 10 to about 16 μm in an unexpanded state, and from about 40 to about 60 μm in an expanded state. The microspheres may be used in either an expanded or unexpanded state, or blends of both. Any suitable thermoplastic resin material may be used to make up the microspheres. Suitable thermoplastic resin materials include, for example, polystyrene, styrene copolymers, acrylonitrile, polyvinyl chloride, vinyl chloride copolymers, vinylidene chloride copolymers, polyimide polymers, and the like. Typically, the thermoplastic resin material is in a solid state at ambient temperature.

Suitable microspheres may also include those made from inorganic materials such as glass, silica-alumina ceramics, vermiculite, pumice, and perlite; or polymeric materials such as epoxy resin, unsaturated polyester resin, silicone resin, phenolics, polyvinyl alcohol, polyvinyl chloride, polypropylene, and polystyrene. In addition, fly ash that is in the form of hollow particles can be used. Examples of commercially available fly ash of this type are sold by Boliden Intertrade, Inc., under the trade names Fillite™ 100 and Fillite™ 150. Suitable microspheres may also include those made from organic or inorganic/organic framework materials such as covalent organic frameworks, metal organic frameworks, or zeolitic imidazolate frameworks.

The microspheres advantageously have a burst pressure sufficient to withstand the forces imposed upon them during the formulation, mixing and dispensing processes. Microspheres having an 80% or greater survival rate when exposed to at least 750 psi are preferred, and those having an 80% or greater survival rate when exposed up to 5500 psi are more preferred. In addition, the microspheres have a low bulk density of from about 0.1 to about 0.5 g/cc.

The microspheres may include a chemical or physical blowing agent within the sphere that permits them to be expanded upon heating. Any suitable blowing agent may be used provided that it causes the microspheres to expand upon heating. For example, suitable blowing agents may include azodicarbonamide, isobutane, pentane, isopentane, $CO_2$, and/or freon. If desired, the microspheres may be surface treated with an interfacial adhesion promoter such as a silane compound.

An "expandable polymeric microsphere" is a microsphere that includes a polymer shell and a core material in the form of a gas, liquid, or combination thereof that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature. In a certain embodiment, an expandable microsphere does not include a binding agent (e.g., a binder phase) found in most syntactic foam preparations. For example, a binderless expandable microsphere includes microspheres that are capable of increasing in size upon heating due to the formation of one or more gaseous voids or bubbles in the interior of the particle to give a micro-bubble or microballoon. Typically such microspheres comprise a hollow particle defined by having a polymeric shell wall surrounding one or more internal, gaseous voids. The lack of a binder agent reduces costs, simplifies processing, increases efficiency, and avoids the use of noxious chemical agents. Of particular importance is that binderless expandable microspheres are capable of fusing to one another, to fibrous material in a composite mixture, or a combination of both. The term "fusible", as used herein refers to microspheres being able to fuse together into a connected foamed or foamable mass comprising a fibrous material.

Expandable microspheres (which can comprise, for example, volatile physical blowing agents such as hydrocarbons or halocarbons encapsulated in thermoplastic shells) can be used in the methods and compositions disclosed herein. Expandable microspheres are available from a variety of vendors, including Akzo Nobel AB under the trademark EXPANCEL. The amount and type of expandable microsphere utilized may each be readily varied to obtain the desired degree of expansion (typically, from about 5% to about 150%, more typically from about 35% to about 70%).

Some microsphere types require binding phases. For example, syntactic foams require a binder phase in order to promote adhesion between microspheres. A rigid binder is typically added to support and reinforce glass microspheres, giving greater strength for a given density. However, excessive rigidity may result in cracking, particularly under thermal shock and cycling. In addition, binders contribute to increased foam density. The most common rigid binder is epoxy, because of its superior strength and resistance to hot, wet conditions. The choice of hardener can include anhydride or amine curing agents, each of which has distinct advantages and disadvantages. Flexible Binders are sometimes used to avoid cracking. However, flexible binders must be carefully designed to avoid degradation under hot, wet conditions. Polyurethane, for example, may show reversion or hydrolysis, and rubbers often suffer from oxidation. Another problem is that flexible binders do not reinforce microsphere fillers, detracting from their effectiveness in density and thermal conductivity.

The fiber reinforced elastic composite materials of the disclosure may further comprise coatings to improve the composites performance against abrasion, fire, environmental attacks and/or to improve the adhesion to other construction materials. In a particular embodiment, the composite materials disclosed herein further comprise a thermal barrier coating including, but not limited to, oxide ceramics (e.g., yttria-stabilized zirconia, refractory metals, stainless steel, alumina compounds (e.g., aluminum oxide), or combinations thereof. In a another embodiment, the composite materials disclosed herein further comprise a wear resistant or impact resistant coating including, but not limited to, hard chrome, zinc, oxide ceramics, carbide, aluminum oxide, tungsten carbide, chromium carbide, chromium oxide, or combinations thereof. In yet another embodiment, the composite materials disclosed herein further comprise a corrosion resistant coating including, but not limited to, nickel-chromium alloys, cobalt-chromium alloys, oxide ceramics, galvanic coatings made from iron and steel alloys, or combinations thereof. In a certain embodiment, the composite materials disclosed herein further comprise an electrically conductive coating including, but not limited to, copper, aluminum, molybdenum, iron-chrome-aluminum, molybdenum-disilicide, or combinations thereof.

In a particular embodiment, the composite materials disclosed herein can comprise external surfaces that have been hardened or comprise wear or impact resistant coatings. The coated or hardened exterior surfaces can provide a first line of defense, by stiffening the assembled composite and forcing fractures to escape through regions of stiffness modulus mismatch, which will help in the arrest of potentially catastrophic fractures.

The reinforced elastic composite materials of disclosure have been specifically designed to have superior shock and impact resistance. For example, composite materials disclosed herein comprising a series of helicoidally stacked fibers within a matrix of lower elastic modulus material are designed to have a specific pitch that is in tune with the wavelength of a propagating shock wave. The combination of modified pitch and difference in elastic moduli between fibers and matrix affects the efficiency with which a specific wave can be reflected. In addition, the chirality of the spiral formed from the assembly of these pitched fibers can affect the specific circular polarization. The composite materials of the disclosure have an additional benefit of added toughness (absorption of energy) by controlling or attenuating the propagation of fractures.

As disclosed herein, the fiber reinforced composite materials can be made using a variety of fibers such as glass, carbon, aramid, nylon, basalt, organic polymer, etc. The surrounding reinforced matrix can also be made of a variety of materials such as epoxies or ceramics. Different fiber architectures have been employed to enhance the toughness, strength, and other properties depending on the desired loading conditions. Shock resistance can be achieved by adding layers to the backside of the material which prevent fragments from spalling away. Shock attenuation is achievable by using a variety of materials that serve the singular function of attenuating specific acoustic frequencies. The composite materials disclosed herein may further contain micropores to improve the impact resistance of the composite materials. The introduction of porosity will reduce the weight of the composites while providing locations to seed new fractures. This reduces the threshold for initiating a new fracture, thereby contributing to the arrest of propagating fractures, while ensuring that the fracturing composite materials still retain high fracture toughness.

Figure 1:
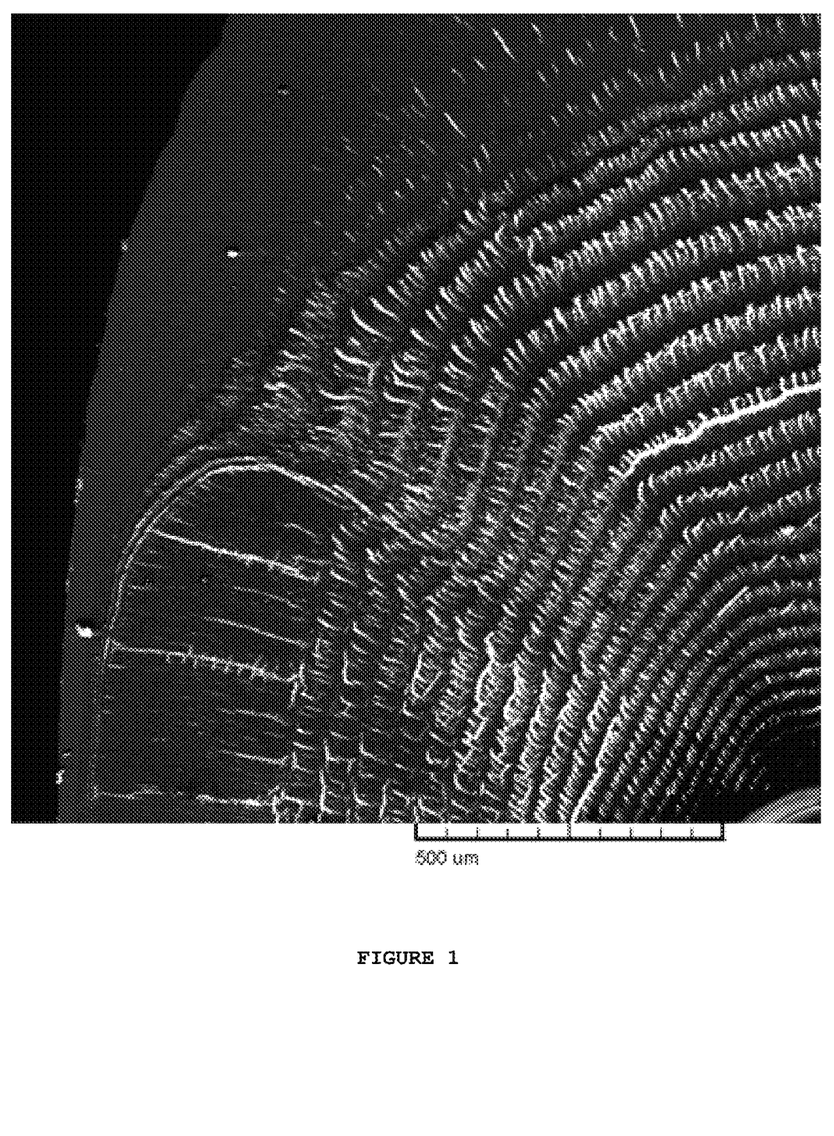
FIG. 1 presents a charge contrast image demonstrating the potential loading of noncatastrophic fractures within a helicoidal composite with annular fiber support FIG. 2A-B provides (A) a model of the helicoidal architecture; and (B) a fracture surface through a helicoidal composite.
Figure 2A:
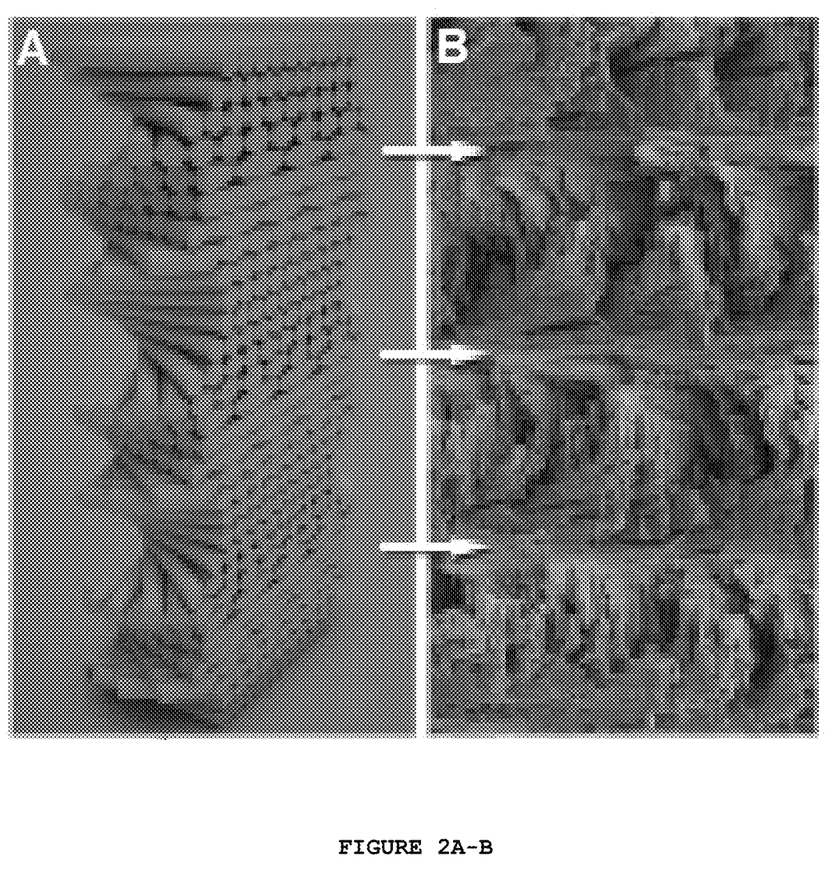
Figure 3:
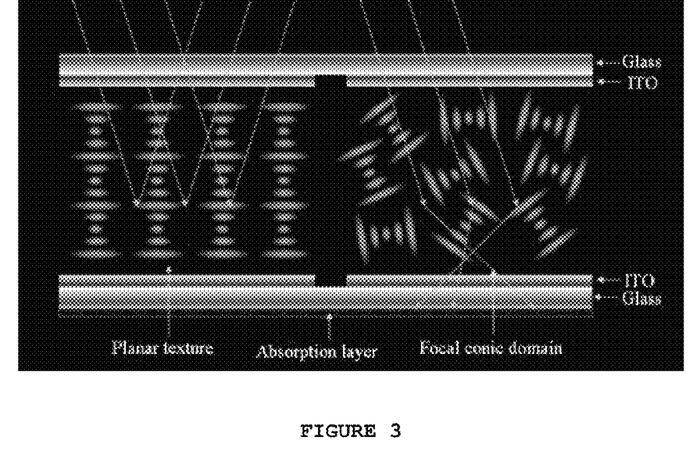
FIG. 3 provides a model of the frequency dependent reflective properties of cholesteric liquid crystals.

In a particular embodiment, a fiber reinforced elastic composite material disclosed herein is comprised of a fiber phase arranged in a helicoidal architecture surrounded by a rigid matrix (e.g., see FIG. 1). The helicoidal architecture serves a dual purpose. The first is forcing fractures to split or arrest as they grow, which vastly improves the toughness of the rigid material, by mitigating the predominate mode of failure: fracture (e.g., see FIG. 2). Additionally, the helicoidally arranged fibers produce an acoustic band gap which attenuates shock waves whose wavelengths lie in the neighborhood of the helicoidal pitch. This is analogous to the optical reflectance seen in liquid crystal materials (e.g., see FIG. 3). By varying the experimental parameters, a graded pitch can be generated which effectively broadens the acoustic band gap so as to attenuate a larger amount of the total shock exposure. Such a band gap could be tuned for the expected shock for a given application. Such a band gap could be tuned for the expected shock for a given application. Additionally, the chirality of the pitch could be alternated one or more times through the thickness of the material to prevent shock from both left and right handed circular polarizations. Further, by alternating the handedness of the helocoidal pitch, warping during the curing of epoxy can be prevented. A number of high-aspect ratio fiber-like materials could be functionalized to exhibit cholesteric ordering and therefor used as a fiber (e.g., carbon nanotubes, inorganic fullerenes, chiral colloidal particles). Further, by incorporating porosity into the matrix material provides the composite materials of the disclosure increased resistance to impacts via nested volumetric fractures while also reducing the weight of the composite. The porosity could take the form of small bubbles, channels, or various closed, and open porous networks. The entire structure could be surrounded by an annulus of fibers which would limit strain within the helicoidal assembly limiting the ability for cracks to open wide enough to overcome the overall resistance capacity of the composite materials. Lastly, the exterior surfaces of the composite materials disclosed herein could be hardened or coated with an impact resistant coating so as to provide a first line of defense by stiffening the assembled composite and forcing fractures to escape through regions of severe modulus mismatch, which can potentially arrest catastrophic fractures.

Processes to make a fiber reinforced elastic composite material disclosed herein can use fabrication processes including, but not limited to, spray lay-up methods, wet lay-up/hand lay-up methods, fiber fabric layup processes, vacuum assisted resin transfer molding processes, vacuum bagging, resin transfer molding processes, pultrusion methods, filament winding methods, chopper gun methods, mandrel wrapping methods, compression molding processes, bladder molding processes, and combinations thereof.

In a particular embodiment, the fiber reinforced elastic composite materials of the disclosure can be fabricated by utilizing a fiber fabric layup process followed by vacuum bagging. A process of self-assembly of cholesteric liquid crystal fibers can be used in order to reduce the pitch and therefor the wavelength of attenuated shock waves, and then freezing the architecture in place with a thermoset resin (e.g., epoxy).

The fiber reinforced elastic composite materials of the disclosure can be utilized to make light weight impact and/or shock resistant materials. It should be understood that the composite materials of the disclosure can be used in a broad variety of applications from numerous fields. Accordingly, the composite materials of the disclosure can be used in countless additional applications beyond those specifically provided for herein. For example, the composite materials of the disclosure can be used to protect against explosions, shrapnel, and high speed projectiles for the police and military (e.g., body armor, vehicle armor, structural components for tanks, and aircraft); in sporting equipment (e.g., gloves, helmets, suits, snowboards, skis, baseball, football or hockey protective gear, etc.); in work safety equipment (e.g., suits, helmets, boots, gloves, hoses, etc.); in automotive applications (e.g., components of body panels, leaf springs, and support structures); or the like.

The following examples are intended to illustrate but not limit the disclosure. While they are typical of those that might be used, other procedures known to those skilled in the art may alternatively be used.

EXAMPLES

Procedure to Prepare Fiber Reinforced Elastic Composite Materials.

Figure 4:
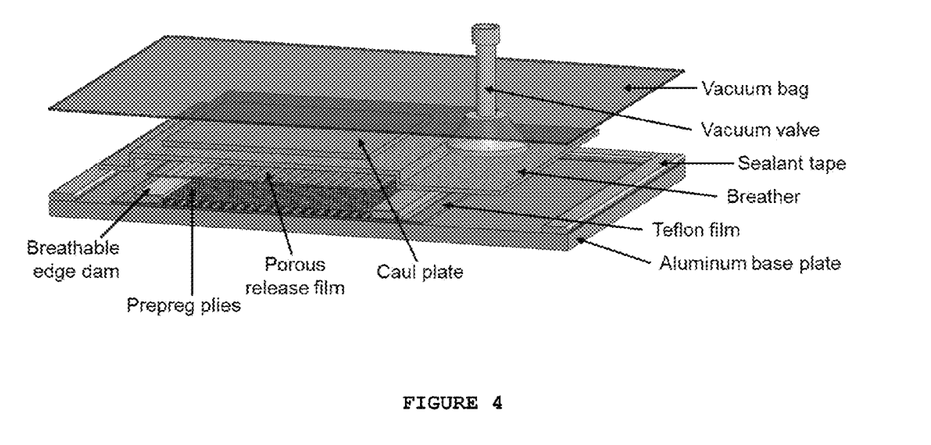
FIG. 4 presents an overview of a vacuum bagging process to make the composite materials of the disclosure. Oriented fiber plies (denoted as pre-preg plies) are laid upon a tool surface. Multiple layers are stacked on each other with specific angles between each layer. After stacking, the layers are covered with a vacuum bagging system. A resin is then infused into the vacuum bag, with the resin penetrating through pores between fiber mesh until completely filled. After filling, the resin/fiber layers are cured through application of temperature and pressure.

The following procedure can be used to prepare the composite materials of the disclosure: oriented fiber plies (e.g., see FIG. 4 "pre-preg plies") are laid up on a tool surface, such as an aluminum platform. Multiple layers were stacked on each other with specific angles (22.5°, 45°, 60°, and 90°) between each layer. After stacking, the layers were covered with a vacuum bagging system. An epoxy resin was then infused into the vacuum bag, with epoxy penetrating through pores between fiber mesh until completely filled. After filling, the epoxy/fiber layers were cured through application of temperature (90° C.) and pressure (1 atm).

As used herein, "Pre-preg plies" refers to fiber plies which comprise tacky but not cured resin. This allows layers of pre-preg plies to be cut, stacked, and/or placed in a mold. Then, with the addition of heat and pressure the pre-preg plies can be consolidated and cured. Typically, epoxy based pre-preg plies should be kept at low temperature to prevent from premature curing.

Composite Testing:

By using a ballistics test, the impact resistance of a composite comprising soft nylon fibers (diameter of ~1 mm) embedded in hard epoxy (Spurrs resin) was evaluated. The composite was shot at from a distance of ten feet using 0.45 caliber, 0.223 caliber, and 5.7×28 mm bullets. The bullets failed to penetrate the composites.

The composites were further tested for resistance to explosions. For the explosion testing, a half-pound of ammonium nitrate was mixed with aluminum powder and packed in a container, which was then triggered by ballistic impact. The composites withstood the explosions, indicating that the composites have both shock and impact resistant properties.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A fiber reinforced elastic composite material comprising:
   a multiplicity of fiber ply layers, each fiber of each layer being rotated along the longitudinal axis at a desired angle relative to the next adjacent layer, each extending longitudinally over the composite, wherein the fiber ply layers are substantially left-handed helicoidal, substantially right-handed helicoidal, or where a portion are substantially left-handed helicoidal while another portion are substantially right-handed helicoidal; and a matrix comprising an elastic material having a modulus of elasticity that is lower than that of the fiber that substantially fills the interstitial spaces between the fibers.

2. The composite material of claim 1, wherein the composite comprises between 2 to 100 independently orientated fiber ply layers.

3. The composite material of claim 1, wherein said fibers comprise 20 to 80 percent by weight of the composite material.

4. The composite material of claim 1, wherein the composite material comprises 2,000 to 70,000,000 fibers.

5. The composite material of claim 1, wherein the fiber ply layers comprise carbon fibers, nylon fibers, acrylic fibers, wood fibers, basalt fibers, glass fibers, aramid fibers, polyethylene fibers, polyparaphenylene fibers, benzobisoxazole fibers, polybenzamidazole fibers, or any combination thereof.

6. The composite material of claim 1, wherein the fiber ply layers comprise fibers having a length between 0.5 mm to 33 mm.

7. The composite material of claim 1, wherein the fibers of the fiber ply layers are treated by sizing, additives, and/or curing.

8. The composite material of claim 1, wherein the elastic material can form crosslinks.

9. The composite material of claim 1, wherein the elastic material is selected from the group consisting of ceramics, thermoset resins, and thermoplastic resins.

10. The composite material of claim 9, wherein the thermoset resin is an epoxy.

11. The composite material of claim 9, wherein the thermoset resins or the thermoplastic resins further comprise one or more fillers so as to reduce cost, control shrinkage, improve mechanical and physical properties, provide ultra violet (UV) protection, weathering protection, surface smoothness, temperature resistance, impact strength, and/or provide fire resistance.

12. The composite material of claim 1, wherein the matrix or the elastic material further comprises microspheres.

13. The composite material of claim 12, wherein the microspheres introduce micropores throughout the matrix.

14. The composite material of claim 12, wherein the microspheres are expandable polymeric microspheres.

15. The composite material of claim 12, wherein the microspheres are from about 10 µm to about 100 µm in diameter.

16. The composite material of claim 1, wherein the matrix further comprises one or more additives selected from the group consisting of accelerators, flexibilizers, release agents, plasticizers, viscosity control agents, hardeners, air release agents, toughness agents, electrical conductivity agents, antistatic agents, and antioxidants.

17. The composite material of claim 1, wherein the composite material further comprises a thermal barrier coating, impact resistant coating, wear resistant coating, corrosion resistant coating, and/or electrically conductive coating.

18. A garment comprising the composite material of claim 1.

19. Sporting or work safety equipment comprising the composite material of claim 1.

* * * * *

UNITED STATES PATENT AND TRADEMARK OFFICE
CERTIFICATE OF CORRECTION

PATENT NO. : 9,452,587 B2  
APPLICATION NO. : 13/957708  
DATED : September 27, 2016  
INVENTOR(S) : Kisailus et al.

Page 1 of 1

It is certified that error appears in the above-identified patent and that said Letters Patent is hereby corrected as shown below:

In the Specification

In Column 1, Line 17, delete "A010082216944" and insert --DMR-0906770-- therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*